June 15, 1954  M. D. LISTON  2,681,415
DETECTOR FOR GAS ANALYZERS
Filed March 25, 1952  2 Sheets-Sheet 1

INVENTOR.
MAX. D. LISTON
BY
Austin Dicke Wilhelm & Padlon
ATTORNEYS

June 15, 1954   M. D. LISTON   2,681,415
DETECTOR FOR GAS ANALYZERS
Filed March 25, 1952   2 Sheets-Sheet 2
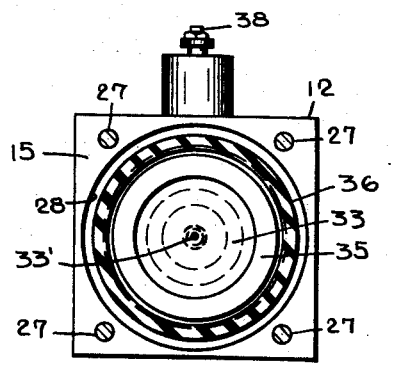
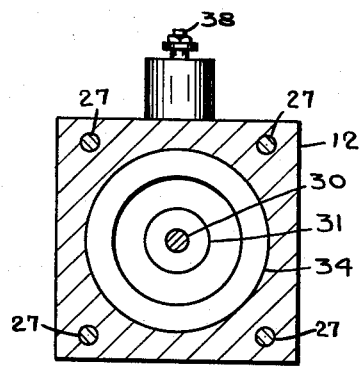
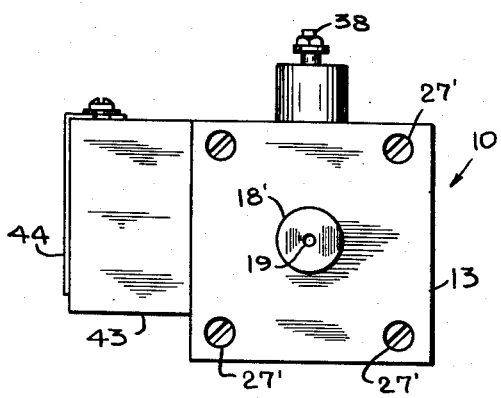
INVENTOR.
MAX. D. LISTON
BY
ATTORNEYS Patented June 15, 1954

2,681,415

UNITED STATES PATENT OFFICE 2,681,415

DETECTOR FOR GAS ANALYZERS

Max D. Liston, Darien, Conn.

Application March 25, 1952, Serial No. 278,352

11 Claims. (Cl. 250—43.5)

This invention relates to a detector for a gas analyzer, and more particularly to a detector unit for apparatus for the analyzation of substances selectively responsive to infra red rays.

In my copending application Serial No. 218,864, filed April 2, 1951, I describe apparatus for the analyzation of mixtures which are selectively responsive to energization by infra red rays. In said apparatus I show a sealed detector vessel wherein detector gas can be exposed for use in analysis.

By my present invention I show improvements over said detector and others currently in use.

As to other currently used detectors, such as the one described and shown in German Patent No. 730,478—Ausgegeben, January 14, 1943, a plurality of parts are shown communicating with each other by tubing. Such type of detector has several disadvantages, a principal disadvantage being the relatively large spatial separation between members thereby giving use to extreme microphonics produced by the surging of long gas columns under the effects of vibration.

Another disadvantage is the bulkiness of the device precluding its use in limited available spaces. Also, many of the joints in the device gradually give use to leaks thereby destroying the functional effectiveness of the device.

With the above and other disadvantages in view it is an object of my invention to provide an efficient, compact, easily assembled detector vessel for use in positive type gas analyzers.

Still another object of my invention is to provide a detector used in gas analysis, having a simplified construction and intermediate shock absorbing leakage proof members.

One further object of my invention is to provide a detector device having a plurality of joinable parts with intermediate shock absorbing proof sealing members to form an integral compact easily connectible unit.

A detailed object of my invention is to provide a detector having a plurality of connectible members, the outer ones of which are provided with a window of material transparent to infra red rays, an easily connectible center member having pressure sensitive means and an electrically insulated conductor to form capacitor in combination with said pressure sensitive means, parts extending from the inner to the outer members and sealing shock absorbing members intermediate the opposed faces of the connecting members.

Other objects and features of my invention will become apparent from the accompanying drawings, in which:

Fig. 4 is a section taken on line 4—4 of Fig. 3.

Fig. 5 is a section taken on line 5—5 of Fig. 3; and Fig. 6 is a right end view of Fig. 1.

Figure 1:
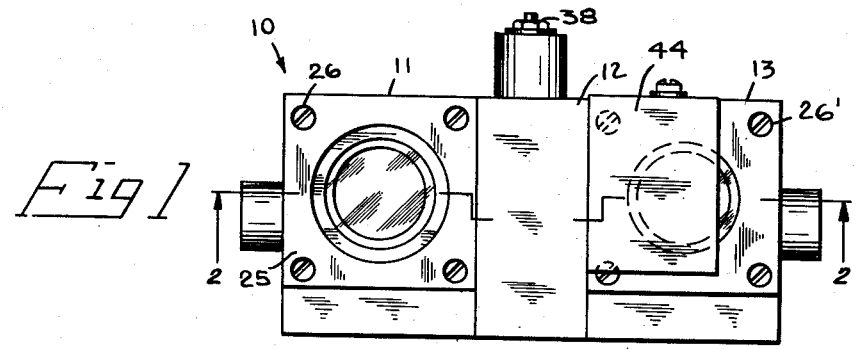
Fig. 1 is a front view of a preferred embodiment of my invention.
Figure 2:
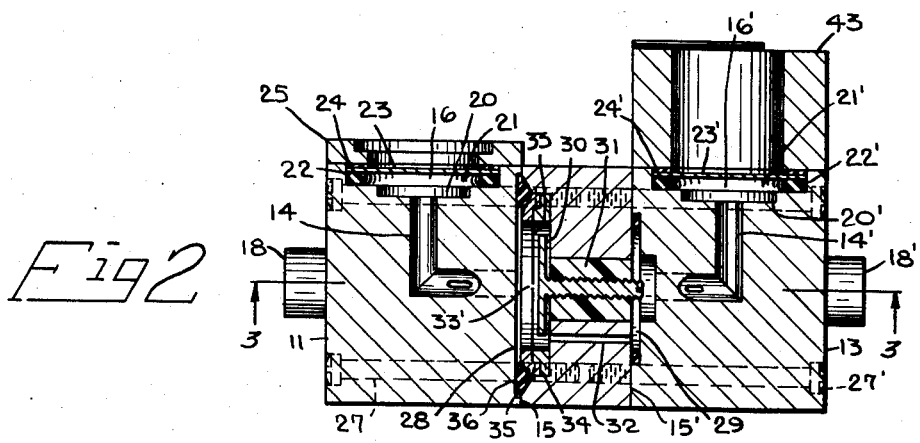
Fig. 2 is a section taken on line 2—2 of Fig. 1.
Figure 3:
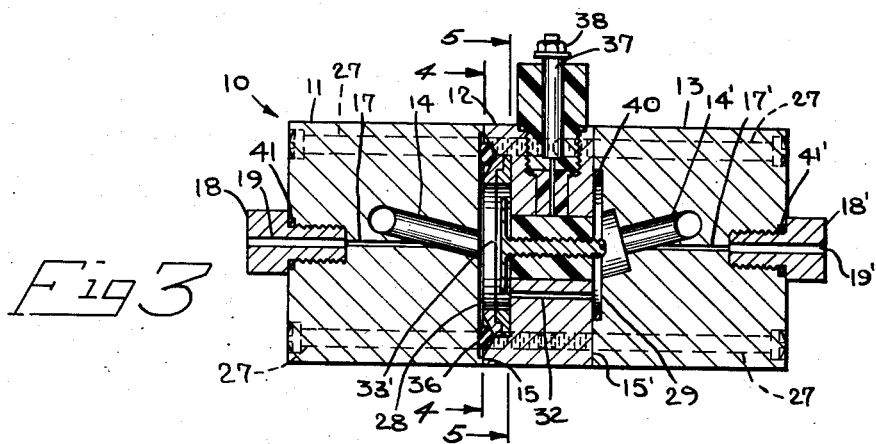
Fig. 3 is a section taken on line 3—3 of Fig. 2.

Referring now to the drawings wherein like reference characters denote like parts throughout, it will be noted that my invention encompasses a detector 10, for positive type gas analyzers and comprises preferably three blocks or parts 11, 12, and 13, respectively although it is to be understood that the detector may be made with less than or more than three blocks. Parts 11 and 13 are of similar construction while the intermediate part 12 is different from either 11 or 13. For purposes of simplification, a detailed description of part 11 will be given and the enumeration of various details pertaining thereto will also apply to part 13 with a prime added to such corresponding member. Part 11 comprises a block having a conduit 14 extending from the inside 15 thereof and angularly upward of the top thereof into a chamber 16. Furthermore, leading into said conduit from the outside as shown in Fig. 3 is a supply conduit 17 with a seal-off member 18 having a central opening 19 through which a gas can be passed into conduit 14. The end of said member 18 may be sealed in any suitable manner after the detector has been filled with the gas to be analyzed. The inside wall 15 of said part 11 is preferably recessed for purposes which will hereinafter be described. The top of said block 11, as hereinafter indicated, is provided with a chamber 16 constituting the recessed portions 20 and 21 of said block. Recess 20 it will be noted is of smaller diameter than recess 21.

Set inside recess 21 is a flexible resilient O ring 22 made of any suitable material, such as rubber and the like. Said O ring is compressible and supports a window 23 made of any suitable transparent material adapted to permit the passage of infra red rays therethrough into chamber 16. Said window is provided with a flat rubber ring or gasket 24 on top of which is mounted a frame 25 held in fixed position on said block 11 by means of screws 26.

Said section 11 is attached to said intermediate part 12 by means of screw members 27 and held rigidly together therewith.

The intermediate block 12, as noted from the drawings, is provided on its side face with recessed openings 28 and 29, respectively, each of relatively different size. Set inside of said block or part 12 is a stationary electrode 30 surrounded by an insulator 31. It will be noted that said stationary electrode is mounted centrally of the opening 28 while the block 12 is provided with a plurality of openings 32 to permit the passage of gas therethrough from opening 28 to opening 29.

Disposed intermediate said electrode 30 and the opening in wall 15 of part 11 is a diaphragm 33 of any suitable material or foil which is fixed in relatively firm position by interlocking ring members 34 and 35. Said diaphragm has a fine pin hole 33' to permit gradual passage of gas from one side of chamber to the other. It will be noted that ring 34 has a flat portion resting against the wall of interior opening 28 and has an outer right angled recessed portion adapted to engage corresponding right angled recessed portion of ring 35 for firmly holding diaphragm 33 in relatively taut position. Furthermore, ring 35 is slightly bevelled so as to accommodate a resilient O ring 36 when part 11 is connected to part 12 by means of screws 27. Said O ring acts as a seal between blocks 11 and 12. Said center block 12 as herein noted contains a pressure sensitive metallic diaphragm and an electrically insulated electrode forming a capacitor in combination with said diaphragm.

Extending upwardly from said insulator 31 is a conductor 37 with a terminal portion 38 in connection with a source of electricity. It will be noted that said conductor 37 is also provided with an insulator 39 which has a threaded portion for attachment to said intermediate section 12, as shown in Fig. 3. Disposed between sections 12 and 13 and for purposes of proper sealing there is provided a resilient O ring 40 which forms a seal at the connecting portion to prevent the escape of any gas from the detector 10.

It will be noted that each of the connecting portions in the device are provided with resilient sealing O rings 36, 40, 40', 41 and 41' which with connecting portions form tight seals preventing the escape of any gas from the detector device.

From the foregoing description taken in conjunction with the accompanying drawings, it will be noted that by my invention I provide a detector assembly comprising a plurality of closely connected blocks whereby cumbersome conduit connections and remote location of the sensitive diaphragm are avoided. Furthermore, a detector according to my invention employs a plurality of O ring seals to seal the faces between the three blocks. This constitutes an improvement over previous types of detector assemblies wherein the joints of the component parts have been made by silver soldering or by employing plastic cements thus making their assembly and disassembly extremely difficult. Furthermore, according to my invention a detector can be readily disassembled without any fear of the gas sealing properties of the detector being lost since the seal off members 13 and 13' can be used to admit other gases into the device.

It will be noted that I also provide a collar 43, for attachment to block 13, which serves as a reflector for rays entering chamber 16'. In addition, I provide an adjustable member or shutter 44 for the top of said collar tube 43 to control the intensity of rays entering through the collar into chamber 16'.

While a preferred embodiment of my invention has herein been described and illustrated, it is to be understood that modifications as to form, arrangement of parts and use of materials may be made without departing from the spirit and scope of the invention as claimed.

I claim:

1. A detector for a positive type gas analyzer, comprising a plurality of intersealed blocks whose adjacent faces are in contact with each other, flexible sealing means for said adjacent faces, the outer block containing corresponding gas chambers and ports and the middle one of which forms a tight leakage proof connection therebetween, gas pressure sensitive means intermediate the middle and one of the outer blocks, a capacitor in the middle block, and sealing means for said blocks, said detection being sensitized by the gas to be analyzed.

2. A detector for use in connection with a selective detector gas analyzer comprising a plurality of interconnected sections, each section containing a chamber, one wall of which has a window of transparent material to permit the passage of infra rays therethrough from an outside source, and a center member for sealed connection with said other member, a pressure sensitive metallic diaphragm adapted to permit capillary leak and an adjustable electrically insulated electrode in combination with said diaphragm forming a capacitor, means connecting the chambers in the outer sections with the center member whereby pressure variations in the chambers of the inner member will produce reflections on said diaphragm, and sealing members intermediate the connecting members.

3. A detector for use in connection with a positive type gas analyzer comprising a block having a gas chamber, one wall of which has a transparent window to permit the passage therethrough of infra red rays and a port in the block leading from the chamber to one of the walls thereof, a member for sealed connection with said block, a pressure sensitive metallic diaphragm in said member, an electrically insulated adjustable electrode in said member in combination with said diaphragm forming a capacitor, another chamber corresponding with the first chamber, and having a transparent window, means connecting the chambers whereby pressure variations in the chambers will produce reflections on said diaphragm, and sealing means intermediate the connecting chambers and members.

4. A detector according to claim 3 in which the sealing means constitute flexible resilient O rings adapted to be compressed and form leak proof seals between the chambers.

5. A selective detector for use in connection with a gas analyzer comprising a pair of outer members and a center section, said outer members each containing chambers and parts, a window of transparent material for each outer section to permit the passage of infra red rays therethrough from an outside source, a pressure sensitive metallic diaphragm having a capillary perforation therein to permit compensation of gas between chambers, and an electrically insulated electrode in combination with said diaphragm forming a capacitor in said center section, means connecting the chambers in the outer members with the center section whereby pressure variations in the chambers of the inner section will produce reflections on said diaphragm, and an O ring shaped, compressible sealing members intermediate the connecting members.

6. A sealed gas detector for use in connection with a positive type gas analyzer comprising outer sections, said outer sections each containing intercommunicating chambers, ports for said chambers and a window of transparent material in each chamber to permit the passage of infra red rays therethrough from an outside source, a center member for sealed connection with said outer sections, said center member having a pressure sensitive metallic diaphragm and an electrically insulated adjustable electrode in combination with said diaphragm forming a capacitor, means connecting the chambers in the outer sections with the center member whereby pressure variations in the chambers of the inner member will produce reflections on said diaphragm, and resilient sealing members intermediate the adjacent faces of the connecting sections and member to prevent leakage of gas therefrom.

7. A gas detector for use in connection with a balanced gas analyzer comprising a pair of outer sections, said outer sections each containing gas chambers, one wall of each section having a window of transparent material to permit the passage of energizing rays therethrough from an outside source, and a center member for sealed connection with said other member, said center member having a pressure sensitive metallic diaphragm with a capillary opening and an adjustable electrode in combination with said diaphragm forming a capacitor, means connecting the chambers in the outer sections with the center member whereby pressure variations in the chambers of the inner member will produce reflections on said diaphragm, and compressible O ring sealing members intermediate the outer sections and the center member forming tight, leakage proof seals.

8. A gas detector for use in connection with a positive type gas analyzer comprising a pair of outer sections, said outer sections each containing gas chambers, one wall of each section having a window of transparent material to permit the passage of energizing rays therethrough from an outside source, and a center member for sealed connection with said other member, said center member having a pressure sensitive metallic diaphragm and an electrode in combination with said diaphragm forming a capacitor, means connecting the chambers in the outer sections with the center member whereby pressure variations in the chambers of the inner member will produce reflections on said diaphragm, and compressible O ring sealing members intermediate the outer sections and the center member, said center member being provided with a plurality of small ports extending from one side to the other side thereof to permit passage of gas therethrough, one of said chambers being provided with a reflector tube and an adjustable shutter to control the passage of rays passing into the chamber.

9. A sealed detector for gas analysis comprising a block having pair of opposed sealed chambers, a port leading from each of said chambers, an intermediate member having a diaphragm normally shutting off one chamber from the other, said diaphragm being sensitive to varying pressures between the two chambers and permitting a capillary leak therethrough, an adjustable capacitor in connection with the diaphragm, sealing means between the chambers and the diaphragm capacitor to prevent the leakage of gas therefrom, and a sealable gas inlet leading to the chambers, means for sensitizing the gas, a reflector tube on one of the chambers and an adjustable shutter for said chamber.

10. A detector according to claim 9 in which the sealing means constitute O shaped resilient flexible members.

11. A detector for use in connection with a selected detector gas analyzer comprising a gas chamber, port means leading from the exterior into said gas chamber, said chamber having a window of transparent material to permit the passage therethrough of infra red rays into the chamber, another chamber corresponding with the first chamber port means intercommunicating one chamber with the other, a pressure sensitive metallic diaphragm intermediate said chambers having a microscopic aperture to permit leakage of gas from one chamber to the other, an adjustable electrically insulated electrode in combination with the diaphragm forming a capacitor, a reflector tube in one of said chambers, and an adjustable shutter for controlling the passage of rays passing into said chamber.

References Cited in the file of this patent

UNITED STATES PATENTS

| Number | Name | Date |
| --- | --- | --- |
| 1,519,555 | Ruben | Dec. 16, 1924 |
| 1,573,870 | Pfund | Nov. 6, 1951 |
| 2,583,221 | Martin | Jan. 22, 1952 |